United States Patent

Bichler et al.

[11] Patent Number: 5,925,952
[45] Date of Patent: Jul. 20, 1999

[54] MAGNETICALLY MOUNTED, POSITION-STABILIZED FLYWHEEL

[75] Inventors: Udo Bichler, Heidelberg; Thomas Eckardt, Edingen-Neckarshausen, both of Germany

[73] Assignee: Teldix GmbH, Germany

[21] Appl. No.: 08/930,258

[22] PCT Filed: Mar. 20, 1996

[86] PCT No.: PCT/EP96/01211

§ 371 Date: Sep. 18, 1997

§ 102(e) Date: Sep. 18, 1997

[87] PCT Pub. No.: WO96/29775

PCT Pub. Date: Sep. 26, 1996

[30] Foreign Application Priority Data

Mar. 21, 1995 [DE] Germany ............... 195 09 628

[51] Int. Cl.[6] .................................................. H02K 7/02
[52] U.S. Cl. ................................. 310/74; 310/90.5; 322/4
[58] Field of Search ........................... 310/74, 90.5; 322/4

[56] References Cited

U.S. PATENT DOCUMENTS

| 4,444,444 | 4/1984 | Beneditti et al. ................... 310/90.5 |
|---|---|---|
| 4,563,046 | 1/1986 | Shimamoto ........................... 310/74 X |
| 4,700,094 | 10/1987 | Downer et al. ....................... 310/90.5 |
| 5,302,874 | 4/1994 | Pinkerton ............................. 310/90.5 |

FOREIGN PATENT DOCUMENTS

| 0049300 | 4/1982 | European Pat. Off. . |
|---|---|---|
| 2842205 | 4/1980 | Germany . |
| 3150122 | 6/1983 | Germany . |

*Primary Examiner*—Nestor Ramirez
*Assistant Examiner*—Judson H. Jones
*Attorney, Agent, or Firm*—Elliott N. Kramsky

[57] ABSTRACT

In a magnetically borne position-stabilizable flywheel, the force generation systems (at least for the radial drive) are designed in accordance with the electrodynamic principle and disposed in the interior of the wheel hub. The coils are situated on the stator and the associated permanent magnets on the rotor. Undesired oscillations are effectively damped. As a result of the displacement of the drive into the wheel hub, it is possible to use small coils. The swivel range of the wheel is sufficiently large.

6 Claims, 1 Drawing Sheet

MAGNETICALLY MOUNTED, POSITION-STABILIZED FLYWHEEL

BACKGROUND

1. Field of The Invention

The present invention relates to flywheels. More particularly, it pertains to a magnetically borne, position-stabilizable flywheel with a large radial dimension relative to the axial dimension.

2. Description of the Prior Art

De 32 43 641 A1 discloses a magnetically borne position-stabilizable flywheel with a large radial dimension relative to the axial dimension. A force generation system is provided for the rotary drive of the flywheel that operates in accordance with the electrodynamic principle. The rotor has a gap at the underside of the wheel into which the motor winding, which is secured to a stator, penetrates for the motor drive. Additional force generation systems are provided for axial and radial displacement of the axis of rotation of the wheel as well as for the generation of tilting moments. The force generation systems are coupled to appropriate sensors via a regulating system, so that position stabilization is possible with a total of five degrees of freedom. U.S. Pat. No. 5,155,402 discloses a flywheel that is radially driveable by means of a force generation system at the outer periphery of the rotor in accordance with the electrodynamic principle. For generating tilting moments, force generation systems in accordance with the electrodynamic principle are provided at the outer periphery of the flywheel. To this end, at the outer periphery of the rotor an annular groove is provided that receives two permanent magnets disposed one above the other and oppositely magnetized. Four coils penetrate into this annular groove and are secured to the stator and traversed by the magnetic flux of the permanent magnet. The directions of the currents in these four coils are switchable to generate tilting moments and axial forces.

DE 31 50 122 A1 describes an electromagnetically borne flywheel that includes two radial and one axial electromagnetic bearing. Sensors which detect the axial and radial position of the rotor are disposed in the immediate vicinity of the bearings and deliver signals to a regulating device that delivers corresponding actuating signals to the magnet coils of the bearings. A motor is provided which is disposed outside the electromagnetic bearing.

DE 28 42 205 A1 describes a flywheel which has a mixed electromagnet-permanent magnet-electrodynamic bearing. In this case, the bearing device has actively regulated stabilization only in the radial direction. The axial direction and the space axes have a sufficiently stiff stabilization due to the design of the magnetic bearing device.

EP 0 049 300 A1 describes an electromagnetically borne flywheel, the hub of which is designed as a disk-shaped hollow body.

SUMMARY OF THE INVENTION

The present invention addresses and overcomes shortcomings of the prior art by providing an improvement in a magnetically borne position-stabilizable flywheel having a large radial dimension relative to its axial dimension. Such improvement comprises the flywheel being electrodynamically stabilizable with respect to the position and alignment of the axis of rotation of the flywheel.

The preceding and other features and advantages of this invention will become further apparent from the detailed description that follows. Such description is accompanied by a set of drawing figures. Numerals of the drawing figures correspond to those of the written description with like numerals referring to like features throughout.

BRIEF DESCRIPTION OF THE DRAWINGS

FIG. 1$b$ is an enlarged view in cross-section of the wheel hub region with sensors for translational movements.

DETAILED DESCRIPTION OF THE PREFERRED EMBODIMENT

Figure 1A:
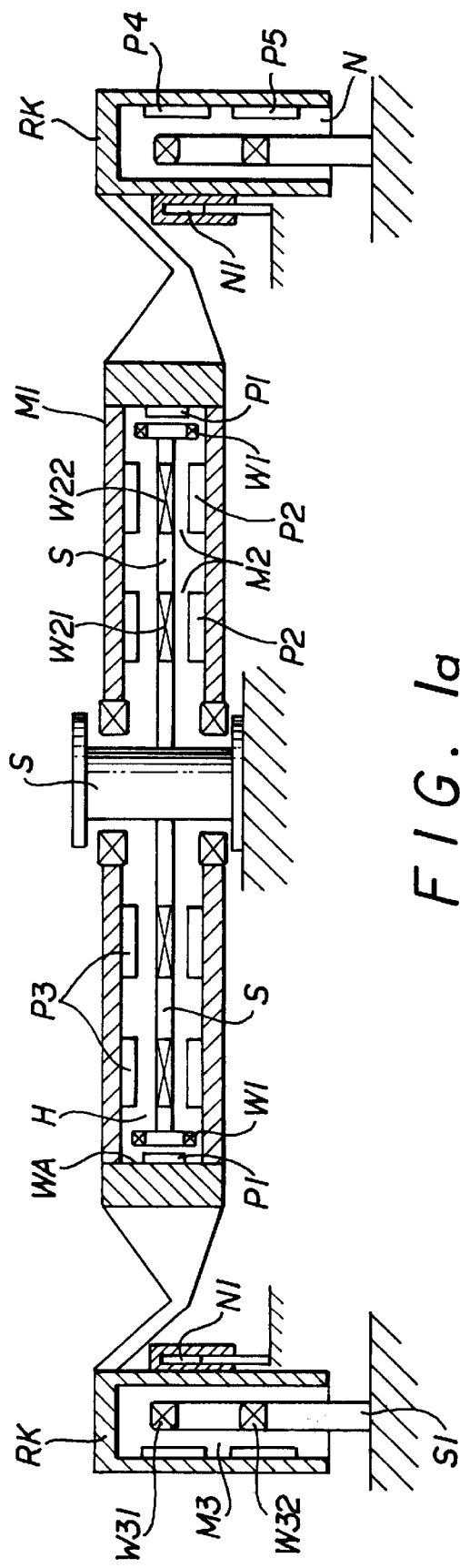
FIG. 1$a$ is a cross-sectional view of the flywheel with magnetic bearing in accordance with the invention.

The flywheel of the invention comprises a wheel hub comprising a substantially-closed, disk-shaped hollow body H, spokes and an outer wheel rim RK that includes an annular groove N and forms the principal mass of the flywheel. The stator S, which is likewise disk-shaped, is secured to a central axis mounted on the housing. The spin axis of the rotor R is identical to that of the stator S. The coils (motor coils) w1 of the force generation system M1 for the rotary drive of the flywheel are situated on the stator S, disposed in the wheel hub, and advantageously located at the outer periphery of the stator disk S in a plane perpendicular to the plane of the disk. Associated permanent magnets P1 (motor magnets) are fixed to the inner surface of the follow body H on a circumferential wall that extends substantially parallel to the wheel axis. The permanent magnets have alternating poles. The motor system comprises an ironless DC motor with electronic commutation. At low speeds, the electronic drive system receives rotor position for the commutation from a simple eddy current sensor system. At higher speeds, (over 200 rpm), commutation is derived from the voltage (back EMF) in the motor windings. This guarantees precise commutation, even in the presence of rotor swivelling.

The force generation system M2 for radial displacement of the axis of rotation of the flywheel is likewise disposed within the interior of the wheel hub. It similarly operates in accordance with electrodynamic principles. Two annular windings w21 and w22 (radial actuator coils) on the disk-shaped stator S lie beside one another. Associated annular permanent magnets P2, P3 are situated on the disk-like surface of the hollow body H. In each case, the permanent magnets P2, P3 are positioned in the regions below and above the windings w21, w22 situated in the stator S respectively. The resultant toroidal magnetic flux is indicated diagrammatically. The result is a force acting in the x direction.

The axial force generation system M3 for axial displacement likewise operates in accordance with electrodynamic principles. It is situated at the outer wheel periphery of the rotor R in an annular groove N extending in the axial direction (y direction), within the outer wheel rim (rotor rim). Two loop-type permanent magnets (upper and lower magnet rim) are situated on the outer wall of the annular groove N. The magnets are disposed above one another in the y direction, with similarly directed poles (unipolar poles). The permanent magnets deliver a uniform circular magnetic field for the axial and tilting moment force generation systems. The coils w31 and w32 of the force generation system M3 are arranged as ring windings, one lying above the other, on a further stator S1 that is rigidly connected to the stator S via a housing. The result is the diagrammatically shown toroidal magnetic flux, which generates a force acting in the y direction.

A force generation system M4 (not shown) is provided to generate tilting moments. The system M4 includes four windings situated in the groove N and embedded in EPOXY resin that extend, in each case, over a ninety degree sector of a circle. Additional details of the geometric arrangement of such windings are contained in DE 32 40 809 C2, in particular FIG. 6b. Tilting moments are generated by excitation of opposed windings with out-of-phase currents.

Figure 1B:
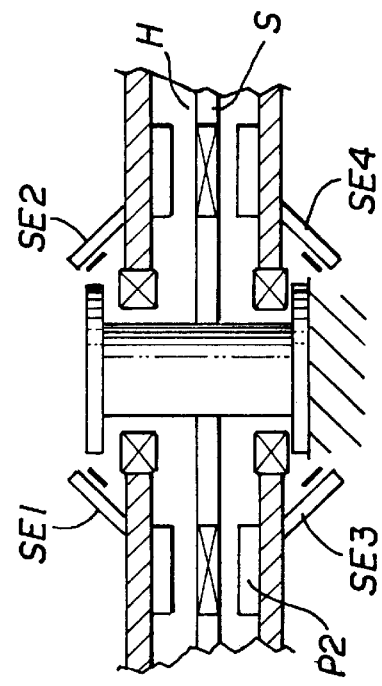

Sensors SE1 . . . SE4 (shown only in FIG. 1b) for detecting movements of the flywheel in the mentioned degrees of freedom, are coupled, via a regulating system RS for position stabilization (not shown) to the corresponding force generation systems M1 to M4. Details of such regulating systems for position stabilization may be inferred, by way of example, from DE 32 40 809 C2 or U.S. Pat. No. 5,155,402, the content and teachings of which are hereby incorporated by reference.

In total, three sensor systems are provided: the tilting sensor system comprises two tilt sensors (tilt sensor coils) with two coil systems in each case. The sensor coils are secured to the housing, opposite one another in the groove N at the outer periphery of the rotor rim. The difference between the corresponding sensor coils measures tilt. The location of the tilt sensors in the region of the force generation system of the tilting moment M4 produces regulation that is little affected by disturbing influences.

Figure 2:
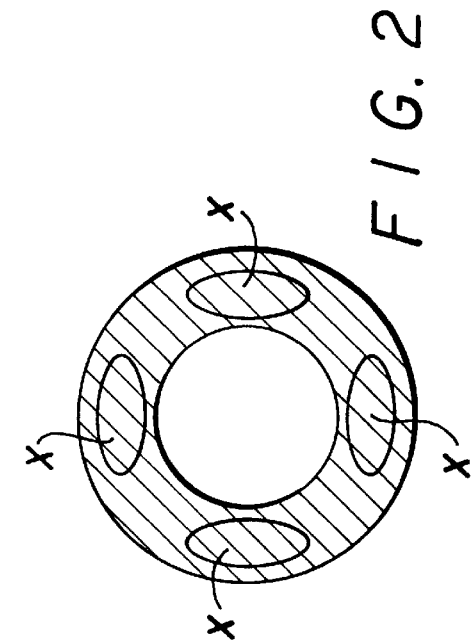
FIG. 2 is a view of a sensor system for the detection of translational movements.

The translation sensor system comprises four sensor coils above the wheel hub and four sensor coils below the wheel hub—SE1 . . . SE4 (see FIGS. 1b and 2). The reference surfaces of the sensors SE1 . . . SE4 comprise spur gears at the top and bottom surfaces of the wheel hub rotor housing H. The sensor coils (x sensor coils), as shown in FIG. 2, are rigidly secured to the stator S, so that the radial differential spacing between stator S and rotor R can be determined. Locating these sensors precisely in the wheel hub region leads to more accurate detection of the movements (active suppression of disturbing oscillations) than in systems with sensors at the outer periphery of the rotor. The translational movements are less disturbed by tilting movements in the wheel hub region.

It is possible to detect all translational degrees of freedom by evaluating the coil output signals.

Determination of axial position is done by comparison of the voltages in the x and y coils fitted above and below the rotor.

Static sensors (not shown) are further provided for low speed commutation. In all cases, eddy current sensors are advantageously employed of simple construction and reliable. Such a sensor possesses a wide bandwidth and is sufficiently linear when the electrical and mechanical properties are suitably chosen. All sensors operate in accordance with the difference principle to avoid drift effects.

The wheel rim of the rotor has a further annular groove N1 that is set in the inner surface, is of aluminum fabrication and is part of the tilt sensor system. The associated coils (tilt sensor coils) are mounted on the stator S1 and project into the annular groove N1.

Two ball bearing races are provided between the axis of the stator S and the wheel hub of the rotor R. In each instance, these operate in the event of failure of the magnetic bearings (i.e. failure of the power supply emergency bearings).

The flywheel of the invention possesses a swivel range of ±4 degrees. Thus, it is ideally suitable as a gyroscopic actuating device for communication satellites. As such, the rotor can be swivelled in relation to the housing in tilt axes that differ from the axis of rotation (vernier gimballing). Moreover, the tilting of the rotor can be utilized for storage of a transverse moment, to compensate external disturbing moments or to alter the movement of rotating structures on board the satellite (e.g. for antenna alignment).

In the event of a failure of the satellite bus voltage, the motor may be automatically switched into the generator mode to furnish the energy for the self-supply as well as a stable bearing down to 1500 rpm. Below that level, the electromotive force EMF becomes too small to deliver sufficient energy to supply the electronic system.

By employing the teachings of the invention, undesired oscillations are effectively damped. Uncompensated oscillations and imbalances, as well as their harmonics, do not occur. In addition, the resonance phenomena generated cannot lead to disturbances in the operation of the sensors. In contrast to electromagnetic force generation systems of the type in which mechanical fluctuations are converted into forces, electrodynamic force generation systems employed in the invention generate fewer undesired vibrations. The use of electrodynamic force generation systems leads to an advantageous mass distribution between rotor and stator.

As a result of the displacement of the radial drive into the wheel hub, the swivel range of the flywheel is sufficiently large, even when using relatively small motor coils.

While this invention has been described with reference to its presently-preferred embodiment, it is not limited thereto. Rather, the invention is only limited insofar as it is defined by the following set of patent claims and includes within its scope all equivalents thereof.

What is claimed is:

1. A magnetically borne position-stabilizable flywheel having a large radial dimension relative to its axial dimension, said flywheel being electrodynamically stabilizable with respect to the position and alignment of its axis of rotation, said flywheel comprising, in combination:
   a) an electrodynamic force generation system for a rotary drive of said flywheel;
   b) coils of said force generation system for said rotary drive being located on a stator disposed in a wheel hub;
   c) associated permanent magnets of said force generation system for said rotary drive being located on said rotor in the region of said coils;
   d) an electrodynamic force generation system for radial displacement of said axis of rotation of said flywheel located in a hollow body comprised of said wheel hub; and
   e) coils of said force generation system for radial displacement comprise disk-shaped windings located beside one another in said stator.

2. A flywheel as defined in claim 1, wherein the permanent magnets for said force generation system for radial displacement are disposed at the interior surfaces of disk-like surfaces of said hollow body in regions above or below said windings located in said stator.

3. A magnetically borne position-stabilizable flywheel having a large radial dimension relative to its axial dimension, said flywheel being electrodynamically stabilizable with respect to the position and alignment of its axis of rotation comprising, in combination:
   a) an electrodynamic force generation system for a rotary drive of said flywheel;
   b) coils of said force generation system for said rotary drive being located on a stator disposed in a wheel hub;
   c) associated permanent magnets of said force generation system for said rotary drive being located on said rotor in the region of said coils; and d) an electrodynamic force generation system for axial displacement of said flywheel being located at the outer wheel periphery of said rotor.

4. A flywheel as defined in claim 3 further characterized in that:
   a) an annular groove extends in the axial direction at the outer wheel periphery of said rotor;
   b) two permanent magnets are disposed one above the other at at least one of said walls of said groove; and
   c) coils associated with said permanent magnets are disposed one above the other as ring windings on a further stator in the region of said permanent magnets.

5. A magnetically borne position--stabilizable flywheel having a large radial dimension relative to its axial dimension, said flywheel being electrodynamically stabilizable with respect to the position and alignment of its axis of rotation, comprising, in combination:
   a) an electrodynamic force generation system for a rotary drive of said flywheel;
   b) coils of said force generation system for said rotary drive being located on a stator disposed in a wheel hub;
   c) associated permanent magnets of said force generation system for said rotary drive being located on said rotor in the region of said coils; and
   d) an electrodynamic force generation system for generation of tilt movements located in said outer edge region of said rotor, so that said system has sector-shaped coils arranged in opposed pairs on said further stator to permit application of mutually opposite currents to said respectively opposite coils.

6. A magnetically borne position--stabilizable flywheel having a large radial dimension relative to its axial dimension, said flywheel being electrodynamically stabilizable with respect to the position and alignment of its axis of rotation, said flywheel comprising, in combination:
   a) sensors which are coupled, via a position stabilization regulating system, to corresponding force generation systems for stabilization of the position and alignment of its axis of rotation;
   b) said sensors for radial displacement of said axis of rotation of said flywheel are disposed in said wheel hub region; and
   c) said reference surfaces of said sensors for radial displacement comprise spur gears at the top and bottom surfaces of said wheel hub housing.

\* \* \* \* \*